G. L. HOLLENBECK.
LIGHT CONTROL FOR AUTOMOBILE LAMPS.
APPLICATION FILED NOV. 29, 1918.
1,309,626.
Patented July 15, 1919.
2 SHEETS—SHEET 1.
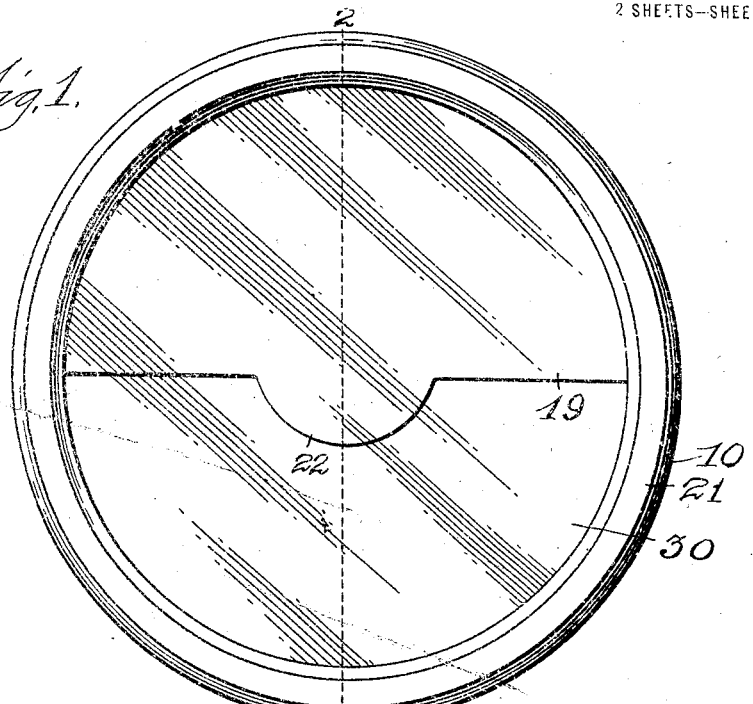
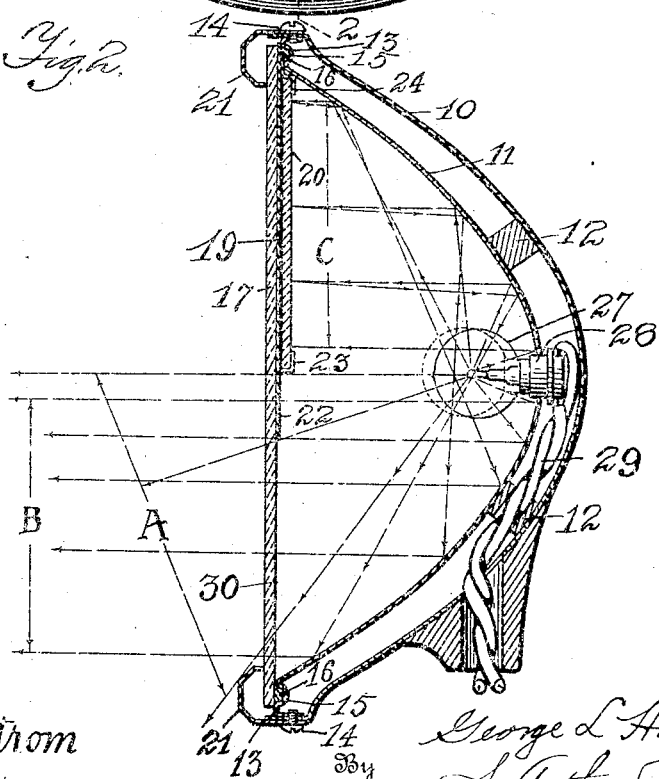
Witness
J. E. Nordstrom
H. A. Sandberg
Inventor
George L. Hollenbeck
By A. Arthur Baldwin
Attorney

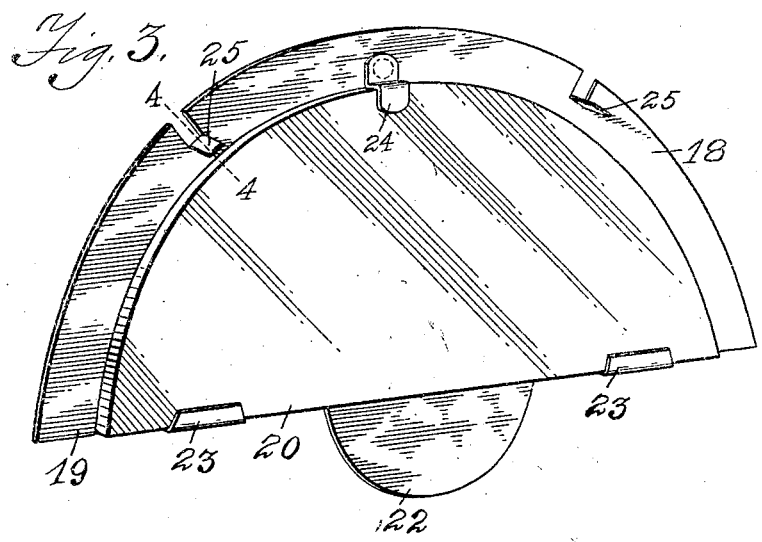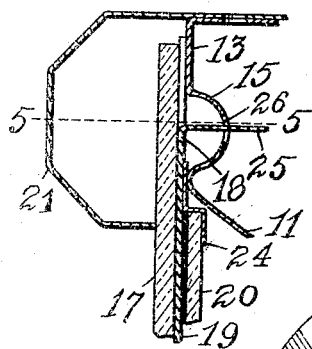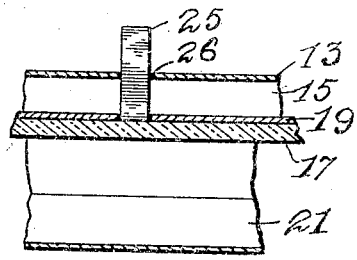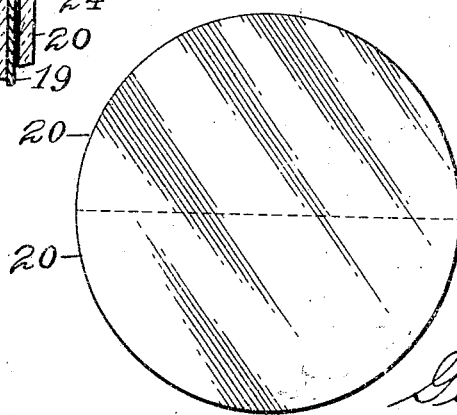

UNITED STATES PATENT OFFICE.

GEORGE L. HOLLENBECK, OF JAMESTOWN, NEW YORK.

LIGHT CONTROL FOR AUTOMOBILE-LAMPS.

1,309,626.  Specification of Letters Patent.  Patented July 15, 1919.

Application filed November 29, 1918. Serial No. 264,484.

*To all whom it may concern:*

Be it known that I, GEORGE L. HOLLENBECK, a citizen of the United States, residing at the city of Jamestown, in the county of Chautauqua and State of New York, have invented certain new and useful Improvements in Light Controls for Automobile-Lamps, of which the following, taken in connection with the accompanying drawings, is a specification.

The invention relates to lamps for vehicles and similar uses in which mechanism is provided to project and control the light; and the object of the improvement is to provide a lamp having a parabolic shaped reflector with an opaque mirror in the upper portion of the front of said parabolic shaped reflector which faces toward the reflector to thereby control the reflected rays of light from said upper portion reflecting them downward to the lower portion of the parabolic reflector and thence out through the lower portion of the lamp by triple reflection thereby providing an intensified beam of light from said lower portion which may be controlled so that it does not rise above a prescribed distance from the surface of a level roadway at two or three hundred feet in front of said lamp and thereby protects the vision of the passerby or bystander from the glare of the reflected light; and second, to mount said mirror in a metallic holder which may be mounted in any parabolic reflector lamp and will attain its object as stated provided the light in said lamp may be adjusted to the proper focus for said reflector and mirror; and the invention consists in the novel features and combinations hereinafter set forth and claimed.

In the drawings, Figure 1 is a front elevation of a parabolic reflector lamp with the opaque light control in the upper portion thereof. Fig. 2 is a sectional view at line 2—2 in Fig. 1 showing a parabolic reflector lamp such as is used in automobiles and similar vehicles with the light controlling mirror mounted therein and showing in dotted line the lines of control of said light including the triple reflection of the upward light rays. Fig. 3 is a perspective view of the rear side of the mirror light control showing the preferred construction and arrangement of the same. Fig. 4 is a sectional view at line 4—4 in Fig. 3 showing the preferred manner of support for the metallic holder for the light controlling mirror; and Fig. 5 is a sectional view at line 5—5 in Fig. 4 showing the close fitting lug inserted through the drilled opening in the rim of the reflector to support said light control mirror. Fig. 6 is a front elevation of a round mirror showing in dotted line the manner of making a pair of light control mirror reflectors from the single disk thereby greatly reducing the cost of the light control mirror and simplifying its manufacture.

Like characters of reference refer to corresponding parts in the several views.

The numeral 10 designates the lamp or lamp casing, and the numeral 11 the parabolic reflector for said lamp and which fits within the casing 10, being separated from said casing by means of a ring 12 near the rear portion of the lamp and an outwardly projecting flange 13 around the front rim of the reflector 11 which preferably has a rearwardly turned flanged outer edge to receive the assembling screws 14 through the rim of the casing 10 and said rearward flange on the reflector 11.

A groove 15 is provided in the flanged rim 13 to receive therein the packing 16 which rests against the front glass cover 17 around the semi-circular lower portion and against the rim 18 of the metallic holder 19 around the semi-circular upper portion of said lamp. A supporting rim or ring 21 is attached by the assembling screws 14 around the casing 10 and reflector 11 to hold all the parts firmly in position by extending down over the outer edge of the glass cover 17.

The mirror holder 19 is preferably made of sheet metal in semi-circular form and should be about the size of one-half the glass cover 17. It is provided on its lower edge with the downwardly projecting central lug 22 which is preferably an integral portion of the plate 19 and preferably a segment of a circle in form to cover the direct central beam of light and thereby protect the vision of the passerby or bystander from said direct light. The lower edge is also provided with the inwardly and upwardly turned lugs 23 which support the lower edge of the mirror 20 on each side of the lug 23. A third lug 24 is preferably spot welded or otherwise attached to the metal plate 19 centrally over the lug 22 so that said mirror plate 20 may be quickly and easily inserted within the lugs 23 and 24 by sliding in from the side, said mirror being a sufficiently close fit between the lugs 23 and the lug 24 to hold the same in position until inserted within the lamp, after which the pressure of the cover 17 upon the mirror and its holder holds said mirror firmly in position within the reflector 11.

The mirror light control holder 19 is preferably installed within the lamp by means of two lugs 25 cut from the edge 18 of the plate 19 at spaced distances from the lug 24 to be turned inward, as shown in Figs. 3, 4 and 5, and inserted into openings 26 in the rim 13 of the reflector 11 during installation, which openings 26 are preferably made to fit closely upon the lugs 25 and thereby retain the holder 19 firmly in position in the lamp until the glass cover 17 and rim 21 are placed against said holder 19 thereby firmly supporting it in the adjusted position.

The light 27 is preferably adjustably mounted in a holder 28 so that it may be moved in and out, as shown in dotted line in Fig. 2, to thereby adjust the light 27 to the proper focus for the reflector 11 and mirror 20, the lamp being shown with an electric bulb light and feed wires 29 extending down therefrom to a source of electrical supply.

The parabolic reflector 11 is preferably as near the true parabolic curve as possible so as to reflect the downward rays of light in parallel alinement throughout the area B, as shown in Fig. 2, said rays being non-intercepted and shine through the clear lower portion 30 of the lamp up to the mid-line or lower edge of the holder 19 and mirror 20 each side of the lug 22. Said holder 19 being opaque prevents the beam of light B rising above the desired height over a level roadway when the lamp 10 is adjusted correctly, and the vision of the passerby or bystander is thereby protected from the glare of the lamp. The upward rays of light C are reflected four times instead of once as is the case with the downward rays of light B, each upward ray being reflected first by the reflector 11 into the mirror reflector 20, thence back into the reflector 11 and thence down to the lower portion of said reflector 11 and thence reflected out in parallel alinement with the rays B, thereby intensifying the beam of light B as it shines upon the roadway.

The area immediately in front of the lamp 10 is lighted by the direct rays A thereby providing for the complete illumination of the roadway both near the vehicle and at a distance therefrom and at the same time protecting the vision of the bystander or passerby.

It is apparent that my light control is absolutely opaque and shields the entire upper portion of the light 27 and reflector 11 as well as the direct rays from the central beam of the light 27 from the vision of the passerby or bystander. It is also obvious that said light control device may be easily and quickly constructed at low cost. It is insertible in substantially all forms of reflector lamps, different sizes being provided as required; the present reflector lamp construction being used only in illumination of the simple manner of installment for my light control. The angle of the mirror 20 in relation to the reflector 11 is such that each ray of light as reflected by said mirror 20 back to the reflector 11 does not coincide with the ray as first reflected by the reflector 11 into said mirror 20 but slightly to one side and thence downward.

It is also apparent that the mirror coating might be placed on the outer side of the upper portion of glass cover 17 but this would require a metallic protector outside of said glass for said coating or otherwise it would be scratched or marred within a comparatively short time. By placing the mirror 20 in a holder which is insertible within the lamp said mirror is entirely protected and while it may be constructed at low cost it is thoroughly adaptable for substantially all forms of reflector lamps.

I claim as new:—

1. In combination with a parabolic reflector, having a grooved rim with openings extending into the groove, packing in the groove, a metal plate engaged with the packing and having pairs of spaced slits extending through its periphery, the metal between the slits of the pairs being bent inwardly and forming lugs extending through the openings, a mirror secured to the rear face of the plate, a glass cover engaged with the front face of the plate, and means to secure the glass cover against the plate to thereby hold the lugs of the plate in said openings of the rim.

2. In combination with a parabolic reflector and a glass cover therefor, a metal plate of substantially semi-circular form, a glass mirror of substantial semi-circular form superimposed upon the rear face of said metal plate, the curved peripheral portion of the metal plate projecting outwardly of the curved peripheral portion of the glass mirror and being engaged with the reflector, fastening devices between the said projecting portion of the metal plate and reflector to support the latter and fastening devices on the metal plate to support the glass mirror from the plate.

3. In combination with a parabolic reflector, having openings, a metal plate covering the upper half of the reflector and having lugs extending through the openings, a mirror to the rear of the plate, fastening devices for the mirror carried by the plate, packing engaged with the rear of said plate, and a glass cover having its upper half engaging over the plate to hold the latter against the packing and having its lower half directly engaging the packing.

In testimony whereof I have affixed my signature in the presence of two witnesses.

GEORGE L. HOLLENBECK.

Witnesses:
H. A. SANDBERG,
BESSIE L. COWDEN.